(12) United States Patent
Veluppillai et al.

(10) Patent No.: US 8,442,447 B2
(45) Date of Patent: May 14, 2013

(54) METHOD, DEVICE AND SYSTEM FOR DETECTING THE MOBILITY OF A MOBILE DEVICE

(75) Inventors: Mahinthan Veluppillai, Waterloo (CA); Nagula Tharma Sangary, Waterloo (CA); Sean Bartholomew Simmons, Waterloo (CA); Perry Jarmuszewski, Waterloo (CA)

(73) Assignee: Research In Motion Limited, Waterloo (CA)

( * ) Notice: Subject to any disclaimer, the term of this patent is extended or adjusted under 35 U.S.C. 154(b) by 432 days.

(21) Appl. No.: 12/697,517

(22) Filed: Feb. 1, 2010

(65) Prior Publication Data

US 2011/0117856 A1     May 19, 2011

Related U.S. Application Data

(60) Provisional application No. 61/262,678, filed on Nov. 19, 2009.

(51) Int. Cl.
*H04B 17/00*     (2006.01)

(52) U.S. Cl.
USPC .................................... 455/67.11; 455/452.2

(58) Field of Classification Search ............... 455/67.11, 455/436, 435.1, 452.2, 450, 441
See application file for complete search history.

(56) References Cited

U.S. PATENT DOCUMENTS

| | | | |
|---|---|---|---|
| 5,574,973 A * | 11/1996 | Borth et al. ................ | 455/435.2 |
| 6,950,664 B2 | 9/2005 | Chen et al. | |
| 7,505,864 B2 | 3/2009 | Sundaralingam et al. | |
| 2001/0015963 A1 * | 8/2001 | Tuomainen et al. ......... | 370/311 |
| 2007/0165583 A1 | 7/2007 | Pecen | |
| 2007/0183344 A1 * | 8/2007 | Joshi ........................... | 370/254 |
| 2008/0099563 A1 | 5/2008 | Wormald et al. | |
| 2008/0280625 A1 | 11/2008 | Larsen | |
| 2009/0224931 A1 | 9/2009 | Dietz et al. | |
| 2009/0240464 A1 | 9/2009 | Dietz et al. | |

FOREIGN PATENT DOCUMENTS

| | | |
|---|---|---|
| WO | 2007031844 | 3/2007 |
| WO | 2008115782 | 9/2008 |

OTHER PUBLICATIONS

Feng, Yang, et al., "Call Taking, Dispatch Decision Supporting, Vehicle Tracing: Emergency Response Systems Under Location Based Services", Third International Conference on Multimedia and Ubiquitous Engineering, Jun. 4, 2009, pp. 481-484, Piscataway, NJ, USA.

B. Zhou et al., "Mobile Velocity Estimation in Multipath Fading Channels", M.Sc. Thesis, Queen's University at Kingston, Ontario, Jun. 1999.

Leonid Krasny et al., "Doppler Spread Estimation in Mobile Radio Systems", IEEE Communications Letters, vol. 5, No. 5, May 2001.

Martin Hellebrandt et al., "Estimating Position and Velocity of Mobiles in a Cellular Radio Network", IEEE Transactions on Vehicular Technology, vol. 46, No. 1, Feb. 1997.

(Continued)

*Primary Examiner* — Lewis West
(74) *Attorney, Agent, or Firm* — MBM Intellectual Property Law, LLP (57) ABSTRACT

The disclosure is directed to a method, computer program product, or a mobile device configured for obtaining a mobility parameter indicative of a mobility of the mobile device. The mobility parameter may be further utilized to configure the operating state of the mobile device. The mobility parameter is obtained using a multi-sense approach, which utilizes both Received Signal Strength Indicator (RSSI) and Frequency Offset (FO) measurements. The mobility parameter is based on statistical parameters relating to the distributions of the RSSI and FO measurements. Various configurations of computer program products, mobile devices and systems are also described.

24 Claims, 11 Drawing Sheets

OTHER PUBLICATIONS

Cihan Tepedelenlioglu et al., "On Velocity Estimation and Correlation Properties of Narrow-Band Mobile Communication Channels", IEEE Transactions on Vehicular Technology, vol. 50, No. 4, Jul. 2001.

Yu Ning, "Mobile Speed Estimation for Hierarchical Wireless Network", Master's Thesis, University of Missouri—Columbia, Jul. 2005.

Theodore S. Stamoulakatos et al., "Vehicle Velocity Estimation Based on RRS Measurements", Wireless Personal Communications (2007) 40: 523-538.

Copending Application entitled "Automatic Activation of Speed Measurement in Mobile Device Based on Available Motion", Dietz et al., U.S. Appl. No. 12/388,006, filed Feb. 18, 2009 (not yet published).

* cited by examiner

METHOD, DEVICE AND SYSTEM FOR DETECTING THE MOBILITY OF A MOBILE DEVICE

CROSS-REFERENCE TO RELATED APPLICATIONS

This application claims the benefit and priority of U.S. Provisional Application 61/262,678, filed Nov. 19, 2009. The foregoing application is incorporated by reference herein in its entirety.

TECHNICAL FIELD

The present disclosure relates generally to mobile devices and, in particular, to detecting a mobility parameter indicative of mobility of a mobile device and optionally utilizing the mobility parameter to allow reconfiguration of an operating state of the mobile device.

BACKGROUND

Mobile devices may be wireless communication devices such as cellular telephones, handheld PDAs, and the like, which are now capable of supporting features beyond voice or text-based communication between users, such as multimedia features. These devices may exemplarily use GPS or other technologies. Mobile devices have been developed which have the capability to identify their own location.

Various methods have been previously proposed for estimating a physical velocity or for detecting the motion of a mobile device. Conventional approaches have discussed the use of such information for improving handoffs between base-stations in cellular networks.

BRIEF DESCRIPTION OF THE DRAWINGS

Features and advantages of the present technology will become apparent from the following detailed description, taken in combination with the appended drawings, in which:

FIG. 9A and FIG. 9C depict a textual indicator with and without a display of the speed of travel. FIG. 9B depicts a bar-graph based graphical indicator. FIG. 9D depicts a countdown for a reconfiguration of operating state based on the mobility parameter.

It will be noted that throughout the appended drawings, like features are identified by like reference numerals.

DETAILED DESCRIPTION

The disclosure generally provides a method, computer program product, and mobile device for detecting a mobility of the mobile device. Various configurations of computer program products, mobile devices and systems for achieving the above are described.

Accordingly, an aspect of the present technology is a method of detecting a mobility of a mobile device, said method comprising: obtaining one or more measurements of Relative Signal Strength Indications (RSSI); obtaining one or more measurements of Frequency Offset (FO); and obtaining a mobility parameter indicative of the mobility of said mobile device, the mobility parameter based at least partly on said measurements of RSSI and FO.

Another aspect of the present technology is a computer program product configured for detecting a mobility of a mobile device, the computer program product comprising code which, when loaded into a memory and executed on an associated processor, is adapted to perform: obtaining one or more measurements of Relative Signal Strength Indications (RSSI); obtaining one or more measurements of Frequency Offset (FO); and obtaining a mobility parameter indicative of the mobility of said mobile device, the mobility parameter based at least partly on said measurements of RSSI and FO.

Another aspect of the present technology is a mobile device configured to detect its mobility, said mobile device comprising: a Relative Signal Strength Indications (RSSI) measurement module configured to obtain one or more measurements of RSSI; a Frequency Offset (FO) measurement module configured to obtain one or more measurements of FO; and a processing module operatively associated with the RSSI measurement module and the FO measurement module to receive said measurements of RSSI and FO therefrom, and configured to obtain a mobility parameter indicative of the mobility of said mobile device, the mobility parameter based at least partly on said measurements of RSSI and FO.

The present disclosure is directed to a method, a mobile device and a computer program product which is capable of obtaining one or more measurements of Relative Signal Strength Indications (RSSI) and one or more measurements of Frequency Offset (FO) for the mobile device, and then at least partly utilizing the measurements of RSSI and FO to obtain a mobility parameter indicative of the mobility of the mobile device.

Figure 1:
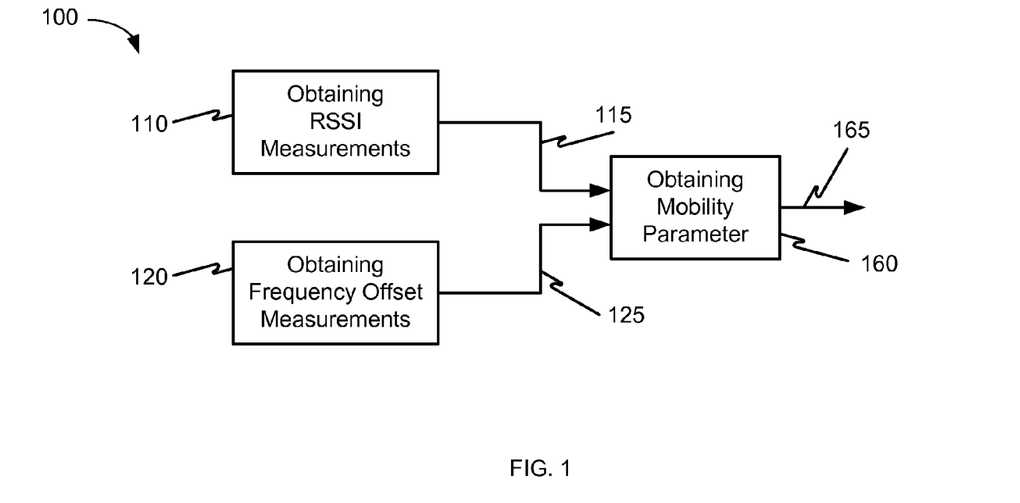
FIG. 1 shows an exemplary flow diagram of the method of the disclosure for detecting a mobility of a mobile device.

Referring to FIG. 1, the method of the disclosure 100 obtains 110, 120 one or more measurements of the Received Signal Strength Indicator 115 (RSSI) and one or more measurements of the Frequency Offset 125. The method 100 further obtains 160 a mobility parameter 165 indicative of a mobility of the mobile device based on the measurements of RSSI and FO.

The term "RSSI" as used herein refers to the strength of the signal received from a transmitter (e.g. a base station in a cellular network, or a network element). The term "Frequency Offset" (FO) as used herein, refers to the frequency difference between the output radio frequency (RF) signal of a local oscillator and a received RF signal received by the mobile device from the transmitter. The method of the present disclosure obtains a plurality of RSSI measurements, wherein each measurement is separated by a time interval and within one or more time windows. A plurality of FO measurements is similarly obtained. The differences between different RSSI measurements are calculated to obtain the differential RSSI. In embodiments, the time interval between adjacent measurements depends on a paging interval pre-set by a wireless network communicatively linked with the mobile device.

The plurality of FO and RSSI measurements can be utilized to respectively obtain a corresponding FO and RSSI distribution. Various statistical parameters of the FO and RSSI distributions may be correlated to the speed of travel of the mobile device. For example, if the mobile device is stationary or is moving at relatively slow speed, the FO distribution is typically relatively narrow, while if the mobile device is moving at a relatively high speed, the FO distribution is typically relatively wide. Accordingly, various statistical parameters (e.g. the width or spread) of the FO distribution may be utilized at least partially to detect the mobility or to obtain a mobility parameter of the mobile device.

In embodiments, one or more RSSI parameters indicative of the RSSI distribution or differential RSSI distribution or both, and one or more FO parameters indicative of the FO distribution or differential RSSI distribution or both are obtained. The mobility parameter is obtained from one or more RSSI parameters and one or more FO parameters. In embodiments, the RSSI parameter used for obtaining the mobility parameter is a width or spread of the RSSI distribution. In embodiments, the FO parameter used for obtaining the mobility parameter is a variance of the FO distribution. The RSSI and FO parameters may be the same statistical measure or may be different statistical measures. In one embodiment, the mobility parameter may be derived from a variance of the RSSI distribution and a spread of the FO distribution.

A worker skilled in the art will readily understand that the accuracy of the detected mobility and/or the estimated speed of mobility may be higher if the number of measurements used to generate the FO or RSSI distributions is higher. The number of measurements used to generate the respective distributions may be determined based on various factors including but not limited to the desired accuracy of the mobile parameter and the desired latency of the methods of the disclosure.

Acts associated with the method described herein can be implemented as coded instructions in a computer program product. In other words, the computer program product is a computer-readable medium upon which software code is recorded to execute the method when the software code is loaded into a memory and executed on an operatively associated microprocessor, exemplarily of the mobile device or a system.

Mobility Parameter

The mobility parameter may be generally understood as a parameter that is indicative of the mobility of the mobile device. In embodiments, the mobility parameter is an estimated speed of mobility of the mobile device obtained from the measurements of both RSSI and FO, and accordingly may be any real number. In embodiments, the mobility parameter is a digital parameter obtained by processing the estimated speed of mobility of the mobile device.

Figure 2:
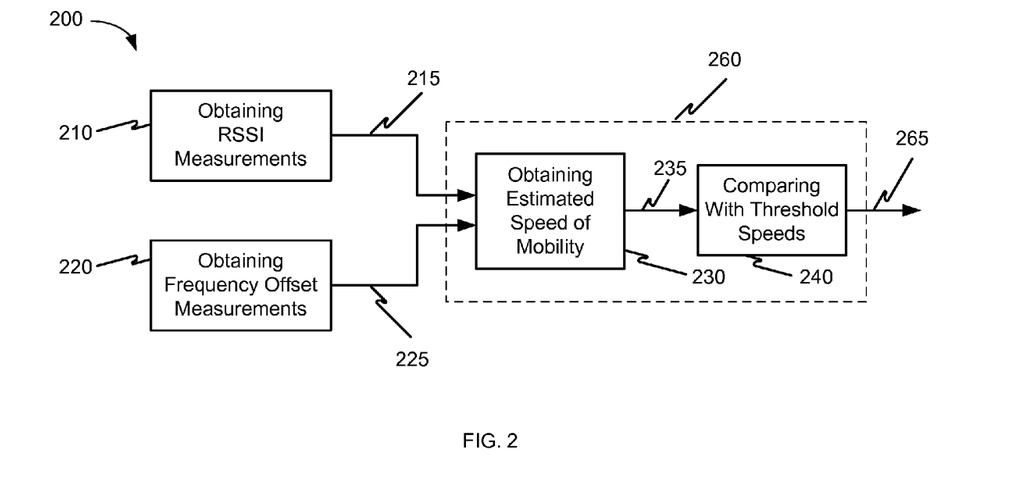
FIG. 2 and FIG. 3 show flow diagrams for detecting a mobility of a mobile device, in accordance with embodiments of the method of the disclosure.

In embodiments and referring to FIG. 2, the mobility parameter 265 is obtained 260 by comparing 240 an estimated speed of mobility 235 obtained 230 from the measurements of both RSSI 215 and FO 225, with one or more threshold speeds. In such embodiments, the mobility parameter 265 may be any of a discrete number of values. The mobility parameter may be expressed as a numerical value (e.g. '0', '1', '2' or '3'), an expression (e.g. 'Stationary', 'Moving Slow', 'Moving Fast' or 'Racing') or the like.

In embodiments, an estimated speed of mobility is obtained from the RSSI and FO measurements, and compared with a first threshold speed and a second threshold speed higher than the first threshold speed, to obtain the mobility parameter. Accordingly, the mobility parameter may take on one of three values ('Stationary', 'Moving Slow' or 'Moving Fast') depending respectively on whether the estimated speed of mobility is less than the first threshold speed, between the first and second threshold speeds, or above the second threshold speed.

In embodiments, a single threshold speed is used resulting in a binary mobility parameter. In such embodiments, the mobile device is considered to be 'Moving' or 'Stationary' if the estimated speed of mobility of the mobile device is above or below the threshold speed respectively. In embodiments, the threshold speed is 20 km/hr.

Figure 3:
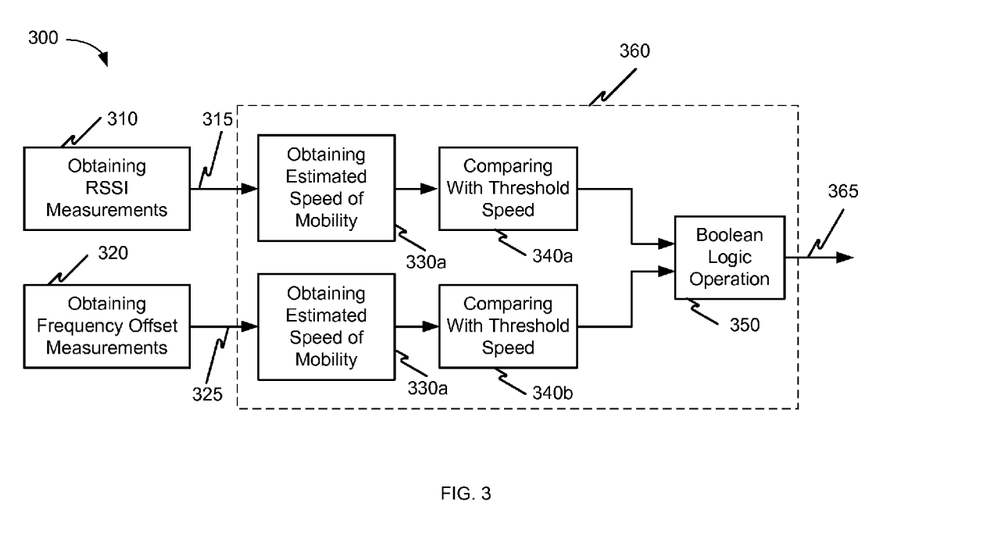

In embodiments and referring to FIG. 3, measurements of RSSI 315 and FO 325 are independently used 330a, 330b to obtain different estimated speeds of mobility. The two estimated speeds of mobility are independently compared 340a, 340b with a threshold speed to obtain a RSSI metric and a FO metric, both of which are binary parameters. The overall mobility parameter 365 is obtained from the binary RSSI and FO metrics by a Boolean logic operation 350. In embodiments, the Boolean logic operation is the logical AND operation.

The threshold speeds may be user-selectable or may be pre-determined. In embodiments, the threshold speed may be stipulated by legislation for the purposes of road-safety, and may be different for different regions.

Figure 10:
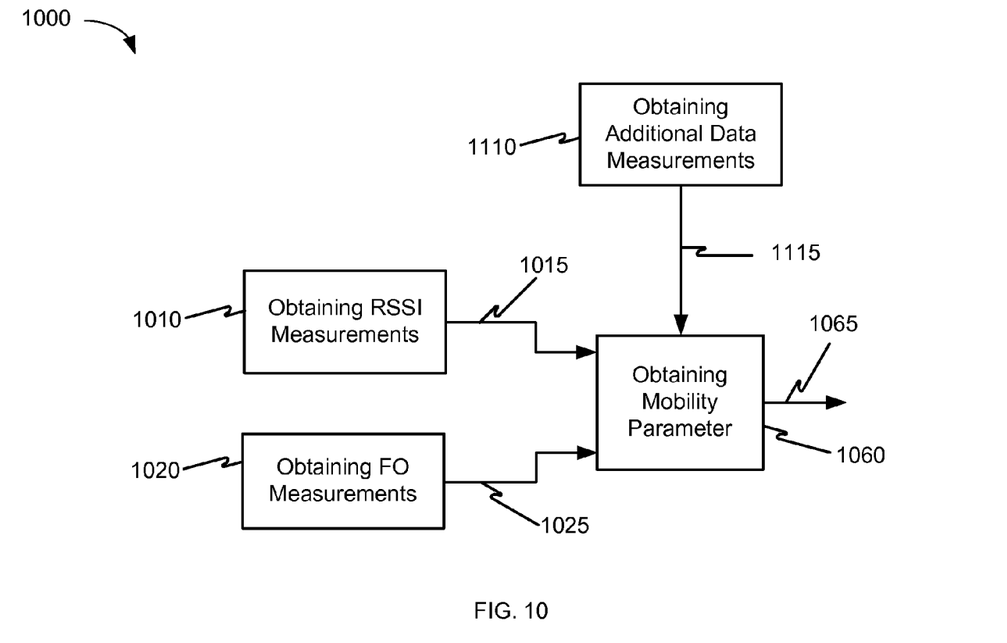
FIG. 10 shows another exemplary flow diagram of the method of the disclosure for detecting a mobility of a mobile device.

In embodiments and referring to FIG. 10, the method 1000 of the disclosure obtains 1010, 1020, 1110 measurements of RSSI 1015, FO 1025 and additional data 1115 and utilizes all of the above measurements to obtain 1060 the mobility parameter. Thus, the mobility parameter 1065 is obtained 1060 by processing statistical parameters relating to the RSSI and FO distributions with additional data measurements 1115. Such optional additional data may include data received from optional GPS systems or accelerometer-based systems or other systems capable of mobility detection as would be readily known to a worker skilled in the art.

In embodiments, the mobility parameter associated with one mobile device may be used at least partially to predict the mobility parameter for one or more other mobile devices located proximally. This may be of particular relevance for mobile devices belonging to the users travelling in the same vehicle (e.g. the same train). The specific mobile device used for determining the shared mobility parameter may be selected based on the battery power levels of the different mobile devices sharing the common mobility parameter.

Figure 4:
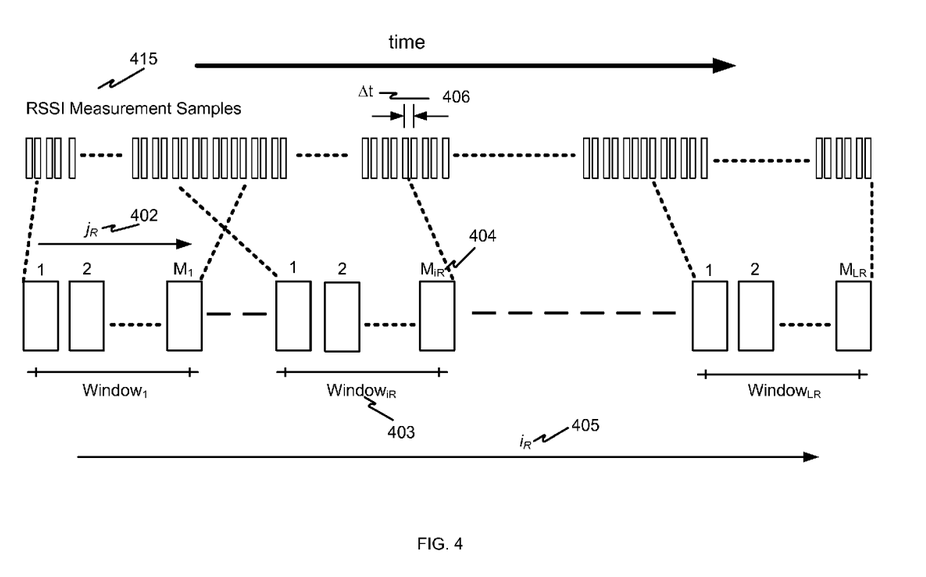
FIG. 4 shows a timing diagram illustrating the RSSI and FO samples used for obtaining the mobility parameter, in accordance with embodiments of the method of the disclosure.

FIG. 4 illustrates the time relation between the various RSSI measurements and their use in determining at least partially the mobility parameter, in accordance with some embodiments of the method of the disclosure. Adjacent RSSI measurement samples 415 are separated by a time interval ($\Delta t$) 406 that depends on the paging interval pre-set by the wireless network communicatively linked with the mobile device. A plurality of successive RSSI measurement samples 415 form a RSSI window. Successive RSSI measurement samples within the same RSSI window are represented by the RSSI sample index $j_R$ 402. Multiple RSSI windows can be utilized for obtaining the mobility parameter. Successive RSSI windows are represented by the RSSI window index $i_R$ 405. Each of the RSSI windows, Window$_i$ 403, has $M_{iR}$ 404 RSSI measurement samples. Different RSSI windows may overlap with each other. FIG. 4 illustrates the case where '$L_R$' RSSI windows, Window$_1$ to Window$_{LR}$, are utilized in the determination of the mobility parameter.

A similar illustration may be shown for the time relation between the various FO measurements. A worker skilled in the art will readily understand that the number of RSSI windows ($L_R$) and the number of FO windows ($L_F$) used for the determination of the mobility parameter may be different. Additionally, the number of measurement samples used within each of the RSSI windows ($M_{iR}$) and FO windows ($M_{iF}$) may also be different.

Figure 5:
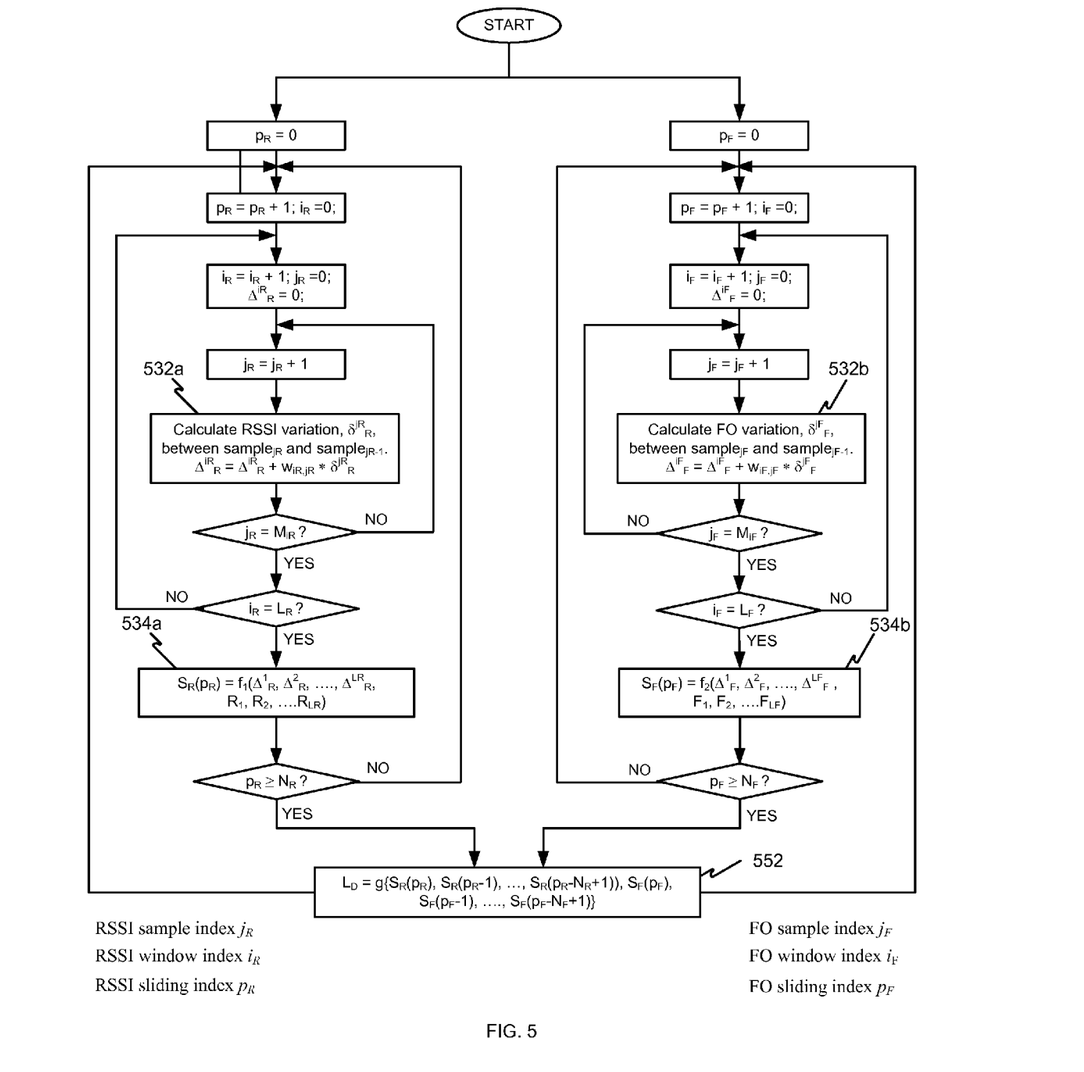
FIG. 5 shows a flow diagram for obtaining a mobility parameter from the RSSI and FO measurements, in accordance with embodiments of the method of the disclosure.

FIG. 5 shows an exemplary flow diagram 500 for evaluation of the mobility parameter from the RSSI and FO measurements. For each window (RSSI window Window$_{iR}$ or FO window Window$_{iF}$), the average variation of the respective parameter ($\Delta^{iR}_R$ or $\Delta^{iF}_F$) is evaluated 532a, 532b based on the weighted ($W_{iF,jF}$ or $w_{iF,jF}$) contributions of the differences in the parameter between adjacent samples (Sample$_j$ and Sample$_{j-1}$), as shown below.

$$\Delta^{iR}_R = \sum_{jR=1}^{M_{iR}} w_{iR,jR} * \delta^{jR}_R ; \delta^{jR}_R = sample_{jR} - sample_{jR-1}$$

$$\Delta^{iF}_F = \sum_{jF=1}^{M_{iF}} w_{iF,jF} * \delta^{jF}_F ; \delta^{jF}_R = sample_{jF} - sample_{jF-1}$$

Appropriate metrics ($S_R$ or $S_F$) are determined 534a, 534b independently from the RSSI and FO measurements based on the average variations of a selected number ($L_R$ or $L_F$) of RSSI and FO windows.

$$S_R = f_1(\Delta^1_R, \Delta^2_R, \ldots, \Delta^{LR}_R, T^1_R, T^2_R, \ldots, T^{LR}_R)$$

$$S_F = f_2(\Delta^1_F, \Delta^2_F, \ldots, \Delta^{LF}_F, T^1_F, T^2_F, \ldots, T^{LF}_F)$$

In the above equations, the different T's refer to thresholds set for the different windows. $f_1$ and $f_2$ may be an appropriately chosen linear or non-linear function or a logical function. The thresholds, the weights, the sampling interval and window sizes may be changed dynamically.

The final mobility parameter $L_D$ may be determined 552 as shown below from a plurality of the RSSI and FO metrics ($S_R$ or $S_F$) obtained from the RSSI and FO measurements. In the equation below, $p_R$ and $p_F$ refer to the sliding indices for the RSSI and FO metrics respectively, and g is a mathematical function of the RSSI and FO metrics. The sliding indices (pR, pF) are updated prior to the next determination of the mobility parameter $L_D$.

$$L_D = g\{S_R(p_R), S_R(p_R-1), \ldots, S_R(p_R-N_R+1), S_F(p_F), S_F(p_F-1), \ldots, S_F(p_F-N_F+1)\}$$

As noted earlier, the sampling interval (i.e., the time interval between successive measurement samples) may be chosen based on one or more factors including but not limited to: whether the mobile device is in an idle mode or an active mode (e.g. while talking or texting or otherwise utilizing the radio), the received mobility parameter, the battery power level of the mobile device. In embodiments, the sampling interval is chosen dynamically.

In embodiments, the RSSI and FO measurement modules are configured in an idle mode of the mobile device, to obtain a single measurement sample in every successive paging interval. This approach may ensure minimal power consumption for the implementation of the method of the disclosure. Measurement samples may be obtained at a faster rate when the mobile device is in an active mode, resulting in a sampling interval that is a fraction (rational or irrational) of the paging interval.

In embodiments, the RSSI and FO measurement modules may be optionally configured to monitor the battery power level of the mobile device and accordingly vary the sampling interval. Such monitoring may be unnecessary if the mobile device is docked or otherwise operatively connected to a power source.

In embodiments, the method of the disclosure may be configured to obtain a more accurate measurement of the mobility parameter if it is expected to be high, or if its most recent value was high. Accordingly, the sampling interval may be dynamically reduced (to increase the number of measurement samples) if the obtained mobility parameter is high, and increased if the mobility parameter is low.

A worker skilled in the art will readily understand that the design of a triggering mechanism for the collection of the measurement samples by the RSSI and FO measurement modules may vary depending on factors including but not limited to the communication protocols used for wireless communications. In some of the embodiments utilizing GSM, the mobile device is configured to obtain four data blocks within a paging interval in its idle mode. The number of RSSI and FO measurement samples obtained within a specific paging interval may therefore depend on the success of the decoding of the data blocks. For example, if the first data block of the paging interval is decoded successfully, the mobile device may ignore the remaining three data blocks of the paging interval resulting in a single measurement sample of RSSI and FO being obtained in the paging interval.

Reconfiguration of an Operating State of the Mobile Device Based on the Mobility Parameter The mobility parameter may be utilized to allow for the reconfiguration of an operating state of the mobile device from a first operating state to a second operating state. An "operating state" of the wireless device generally refers to any state of operation of the mobile device. An operating state may thus be defined by various device parameter values and the enablement settings (e.g., enabled or disabled) of one or more device features used for that state of operation of the mobile device. A worker skilled in the art will readily understand that the number of possible operating states for a mobile device may thus depend on the number of device features that can be enabled or disabled, the number of device parameters that can be modified, or the like.

In embodiments, each operating state of the mobile device has a respective subset of device features that are enabled while the remaining device features are disabled. Some device features (e.g. texting) may be enabled in a first operating state while they are disabled in a second operating state.

The reconfiguration of an operating state may thus include enabling or disabling of one or more features of the mobile device based on the mobility parameter. In embodiments, various device features of the mobile device may be disabled if the mobility parameter indicates that the mobile device is 'Moving'. Device features that may be disabled include text messaging, non-hands-free voice communications etc.

In embodiments, the features that may be enabled, disabled or tailored based on the mobility parameter include but are not limited to any one or a combination of the following: typing, browsing, making phone calls while driving (hands-free or otherwise), enabling or disabling a Bluetooth or similar connection with the vehicle's audio system, implementing IT settings (e.g. disabling email notifications, filtering important calls or the like), enabling or disabling GPS-based applications, changing profiles (exemplarily including a change in the size of the icons and/or fonts while driving to allow for ease of reading) and disabling gesture detection mechanisms. Gesture detection mechanisms may include those that utilize accelerometers to detect a sudden movement of the mobile device, and may be used exemplarily to boot up the mobile device when picked up by the user.

In embodiments, the mobile device may, depending on the detected mobility parameter: activate Bluetooth to enable hands free operation, text to speech and speech to text; activate the speaker of the mobile unit for hands free operation; activate voice command mode; activate proximity sensors in vehicle with set duration to be used for more accurate speed estimate; activate GPS-based systems; or disable all alerts such as email, text message and phone, if hands free operation is not desirable.

Figure 6:
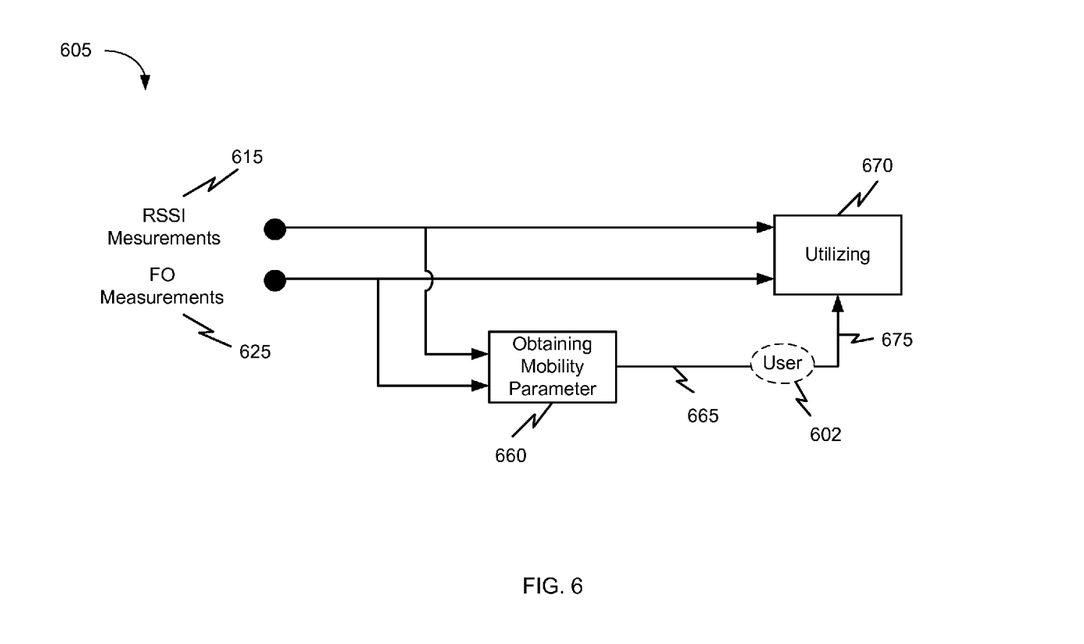
FIG. 6 shows an exemplary flow diagram illustrating the utilization of the mobility parameter to allow a reconfiguration of a mobile device.

In embodiments and referring to FIG. 6, the reconfiguration 675 of the operating state of a mobile device is based on an optional user input received from a user 602 of the mobile device based at least partly on the mobility parameter 665. In embodiments, the user may, based on the mobility parameter, determine whether to reconfigure the mobile device to a new operating state. The dotted lines for the user 602 in FIG. 6 is intended to indicate that the user is excluded and is therefore not meant to be considered included in the technology discussed herein.

Alternatively, the reconfiguration 675 of the operating state of a mobile device may occur automatically and take into account the mobility parameter 665. A user may be provided the option of over-riding the automatic reconfiguration of the operating state by providing a useroverride input to the mobile device. For example, a passenger in a car may choose to override any automatic configuration of his/her mobile device's operating state.

In embodiments wherein the reconfiguration of the operating state of a mobile device is based on an input received from a user, the mobility parameter is at least partly made user perceptible to the user via a user interface of the mobile device. The mobility parameter may be taken into account by the user prior to enabling, disabling, or tailoring various functions of the mobile device. For example, an estimated speed of mobility of the mobile device may be used by the user to assess if voice communications should be limited to a hands-free mode.

In embodiments, the user may manually choose the features and/or the parameters defining the second operating state to which the mobile device is reconfigured to. For example, the user may opt to disable text communications if the user assesses the mobility parameter to be too high. In embodiments, the user may be provided a plurality of potential operating states for the reconfiguration.

The mobility parameter may at least partly be made user perceptible either visually (e.g. displayed) or using an audible or tactile signal. In embodiments and referring to FIGS. 9A to 9D, the user interface of the mobile device may be configured for user perceptibility of at least part of the mobility parameter using one or more mobility indicators that differ in symbols used or style. In embodiments, the display of the mobility parameter to the user may occur prior to the reconfiguration of the operating state of the mobile device.

Figure 9:
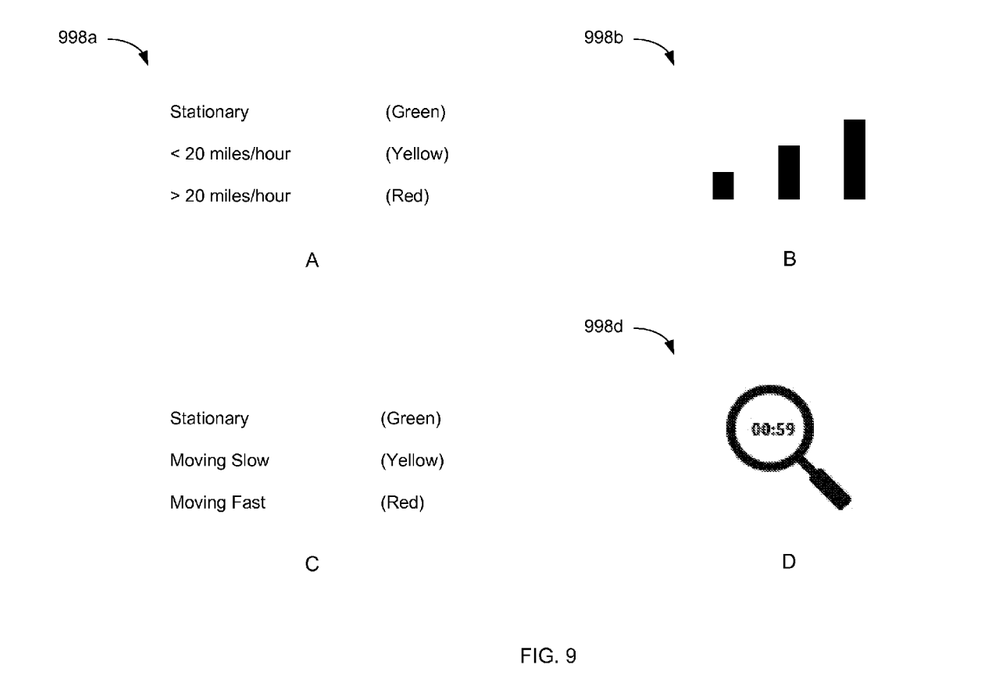
FIG. 9 illustrates various exemplary indicators or symbols that may be utilized by a user interface of the mobile device to display at least part of the mobility parameter.

In embodiments and referring to FIG. 9A, numerical indicators 998a can be used to indicate an estimated seed of mobility of the mobile device based on a confidence interval (e.g. 50 miles/hour vs. 70 miles/hour, with 95% confidence).

In embodiments, various (graphical indicators can be used to represent the mobility parameter. For example, a higher number of bars 998b indicate a higher mobility parameter in FIG. 93.

Different colored indicators may be used to indicate the mobility parameter Exemplarily, a green indicator can show that the mobile device is stationary, while yellow and red indicators denote that the mobile device is moving at a relatively slow or fast speed respectively. The correspondence between the color of the indicator and the detected mobility is shown in FIG. 9C.

FIG. 9D shows an exemplary depiction 998d of the estimated time remaining prior to the reconfiguration of the operating state of the mobile device. A worker skilled in the art will appreciate that the total time duration prior to the reconfiguration may be user-selected or may be pre-determined.

A user of the mobile device or a network operator may be provided the option to pre-set a minimum value, a maximum value, or both, for various parameters relating to the mobility parameter. Alternatively, pre-set parameters may be automatically assigned.

Pre-set parameters may be used in different ways. In embodiments, the pre-set parameters may be used in an automated fashion to modify the operating state. For example, if the mobility parameter does not satisfy one or more corresponding pre-set parameters, the operating state may be automatically reconfigured such that text and/or email communications are disabled.

In embodiments, voice communications may be denied automatically if the mobility parameter does not satisfy a mobility criterion range, which may be pre-set or user-specified. In embodiments, voice communications may be configured to be denied if the mobility parameter does not satisfy the mobility criterion range with the exception of receiving an override input from the user of the mobile device.

The pre-set parameters may be different for different regions. For example, the pre-set mobility criterion range for disabling voice communications may be different for Europe and United States. Automatically assigned pre-set parameters may also depend on the age of the user of the mobile device.

In embodiments, the mobility parameter may be combined with location data prior to the reconfiguration of the operating state. This may be particularly useful if the user is driving in regions with differing laws regarding the use of a mobile device while driving. For example, a country may ban the use of both text messaging and voice communications while driving while a second country may ban only the former.

Figure 8:
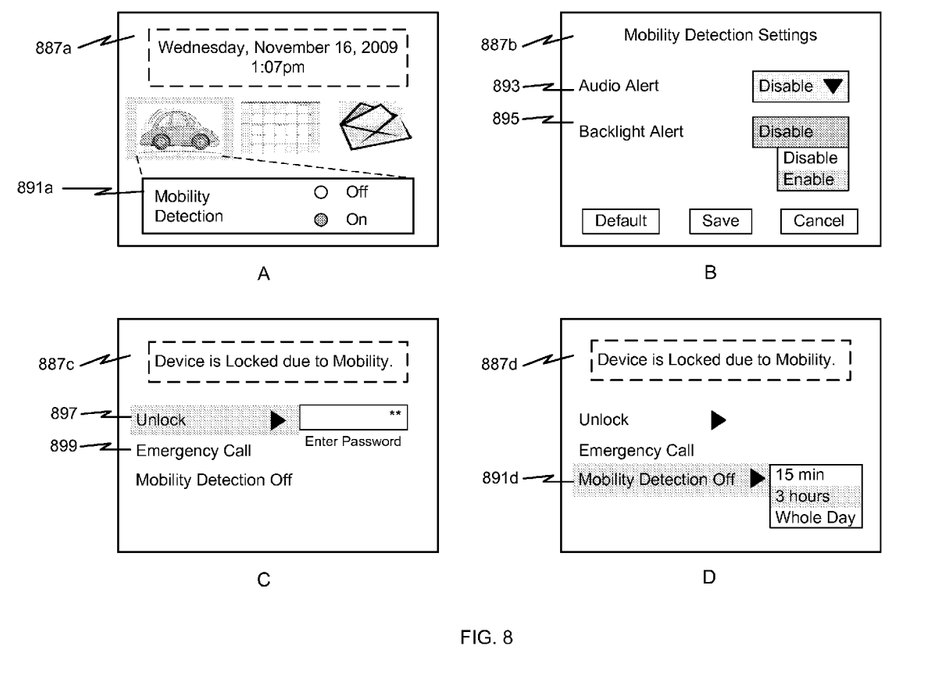
FIG. 8 illustrates exemplary user interfaces of the mobile device for various configurations.

The mobile device may also be configured to signal an alarm to a user via a user interface thereof whenever one or more parameters related to the mobility parameter (e.g. estimated speed of mobility) do not satisfy one or more corresponding pre-set parameters. Such a signal may be a visual signal (e.g. the backlight of the device turns on), an audible signal, a tactile signal, or a combination of the above. FIG. 8B shows an exemplary user interface 887b for a mobile device wherein a user may select and save settings for handling audio 893 and backlight 895 alerts.

In embodiments, the user interface of the mobile device may be configured to signal for user perceptibility if the mobility parameter changes. Exemplarily, a mobile device may be configured to produce an audible signal if it changes speeds from a relatively fast speed to a relatively slow speed.

In embodiments, the mobility parameter may be displayed or otherwise indicated, at a monitoring network terminal or at a peer mobile device used for monitoring. Such techniques may be particularly valuable if a speed of travel of a teenage user of a mobile device needs to be monitored by his/her adult guardians.

In embodiments, the mobile device may be configured to send data to or receive data from communicatively linked peer mobile devices or network terminals (e.g. servers). At least part of the sending or receiving of data may occur in real-time.

In embodiments, the data sent to or received from peer mobile devices or network terminals may include data indicative of the mobility parameter. Exemplarily, the mobility parameter may recorded for a period of time (e.g. a month) and may be sent to a network server or a peer mobile device as the user's driving record for that period of time.

In embodiments, the mobile device may be configured to enter into a 'Locked' operating state when the mobility parameter is high, with the user being provided the opportunity to over-ride this automatic reconfiguration and to thus 'Unlock' 897 the mobile device as shown in the exemplary user interface 887c of FIG. 8C. The user may be required to enter a password prior to unlocking the mobile device. The user may also be provided the option to over-ride the automatic reconfiguration for making emergency calls 899. In embodiments, mobility detection may also be enabled or disabled 891 from a home screen 887a of the mobile device, as shown exemplarily in FIG. 8A.

In embodiments, the user interface may also be configured to allow the user to unlock the mobile device and to disable 891d the mobility detection functionality for a set duration of time as shown in the exemplary user interface 887d of FIG. 8D. Data relating to the time and the duration of such an 'Mobility Detection Off' period may be recorded and sent to a central server (e.g. the BES). Such information may be made available to law enforcement officials, if requested. Thus, in embodiments, the data sent to peer mobile devices or network terminals may be data relating to the reconfiguration of the operating state of the mobile device.

In embodiments, the user may not be provided the option to override the automatic reconfiguration of the mobile device except to make emergency calls. This option may be valuable especially if the user of the mobile phone is not an adult. Under this condition, a plurality of preset phone numbers (e.g. 911, or phone numbers of adult guardians) may be placed as options in a pull down menu for making emergency calls. In embodiments, email addresses of adult guardians may also be provided as options.

In embodiments, acts associated with the method described herein can be implemented as coded instructions in plural computer program products, each of the computer program products being a computer-readable medium upon which software code is recorded to execute appropriate portions of the method when the software code is loaded into memory and executed on an operatively associated microprocessor.

Mobile Device

The mobile device is capable of transmitting or receiving information, or both, via a wireless communication medium such as radio, infrared, or the like. The communication capabilities of the mobile device may include voice communication capabilities, data communication capabilities, or a combination thereof. The term "mobile device", for the purposes of this specification, shall include any wireless handheld, smart phone, PDA, tablet, laptop, notebook, netbook, or other communications device that is capable of transmission and reception of data via a wireless communication medium such as radio, infrared or the like. Other types of mobile devices would be readily known to a worker skilled in the art.

Figure 7:
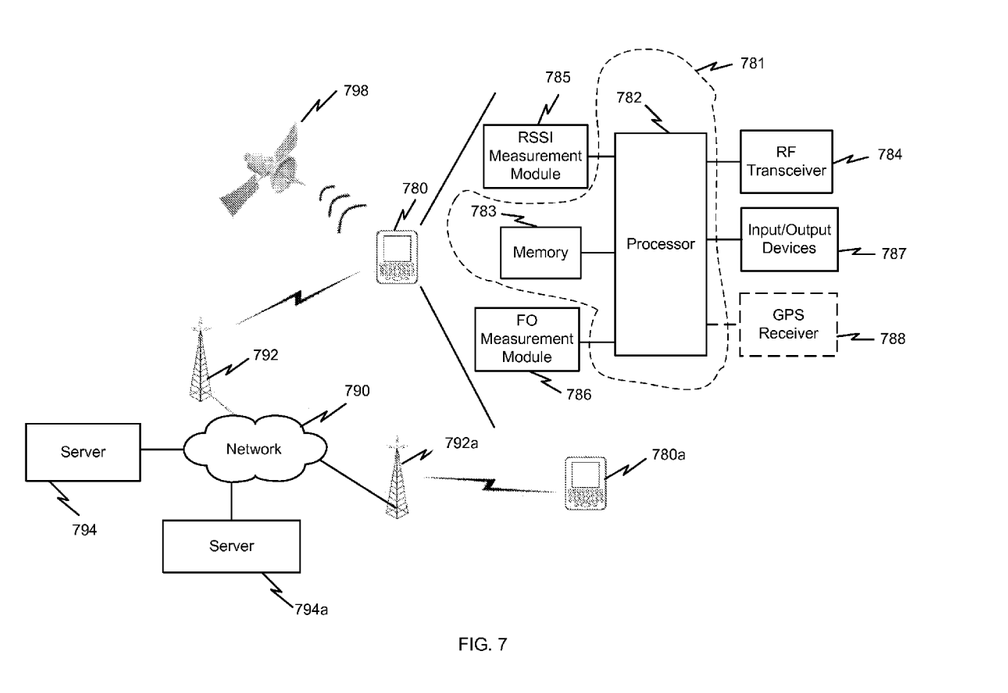
FIG. 7 is a schematic of an exemplary mobile device configured for detecting its mobility.

In embodiments and referring to FIG. 7, the mobile device 780 comprises a RSSI measurement module 785 and a FO measurement module 786 configured to obtain measurements of RSSI and FO respectively. The RSSI 785 and FO 786 measurement modules may optionally comprise memory modules or be operatively associated with memory modules for storing the measurements of RSSI and FO.

A processing module 781 may be operatively associated with the RSSI 785 and FO 786 measurement modules, and may be configured to coordinate their functions, and to process the RSSI and FO measurements optionally with additional data to obtain the mobility parameter. The processing module 781 may also be used to configure the operating state of the mobile device. Accordingly, the processing module 781 may be configured to execute the appropriate software code that controls the various features of the mobile device.

The processing module 781 may comprise one or more processors 782. In embodiments, the processing module 781 comprises or is operatively associated with a memory module 783 configured for storage of different types of data. Appropriate processors 782 and memory modules 783 would be readily known to a worker skilled in the art. In embodiments, the FO measurement module, the RSSI measurement module and the processing module are integrated into a single unit.

In embodiments, the mobile device 780 also comprises input/output devices 787, which may serve in part as user interfaces. Input devices may be used to receive a user input from a user regarding the reconfiguration of the operating state of the mobile device based on the mobility parameter, while output devices may be configured to indicate to a user the mobility parameter. The input/output devices 787 may include one or more of the following: a display (e.g. a small LCD screen), a thumbwheel, a trackball, a keyboard, touch screen, a keypad, a button, a USB or serial port for connecting to peripheral equipment, a camera, a display, a speaker and a microphone. The display may optionally have touch-screen functionality.

Additional techniques (e.g. accelerometer-based, GPS-based or the like) may be optionally incorporated with the method of the present disclosure for additional accuracy. A worker skilled in the art will readily appreciate that the incorporation of additional techniques must be done selectively to ensure that the required accuracy of mobility detection is obtained at a preferred level of power consumption. In embodiments and referring to FIG. 7, the mobile device comprises a GPS receiver 788 configured to receive GPS radio signals from the one or more orbiting GPS satellites 798 to provide additional data regarding the location and/or mobility of the mobile device. The GPS receiver 788 may be embedded within the mobile device or externally connected, such as, for example, a Bluetooth™ GPS puck or dongle.

In embodiments, the FO measurement module comprises a voltage controlled temperature compensated crystal oscillator (VCTCXO) or the like, and is further configured to compare a RF timing signal received from a network element of the wireless communications network with the RF output signal of the VCTCXO, to determine the FO. Other techniques and/or hardware circuitry for measuring FO will be readily known to a worker skilled in the art.

A worker skilled in the art will readily appreciate that the term "timing signal" as used herein generically denotes any signal used for synchronization between the mobile device and the wireless network, regardless of the technology used by the wireless network and as such may be known by different terminologies for different types of wireless networks. Network elements of wireless networks typically transmit the timing signal to the mobile device to allow the mobile device to compensate for Doppler effects and to maintain synchronization with the wireless network. The network element transmitting the timing signal to the mobile device may be a base station or an enhanced node of the wireless network.

Figure 11:
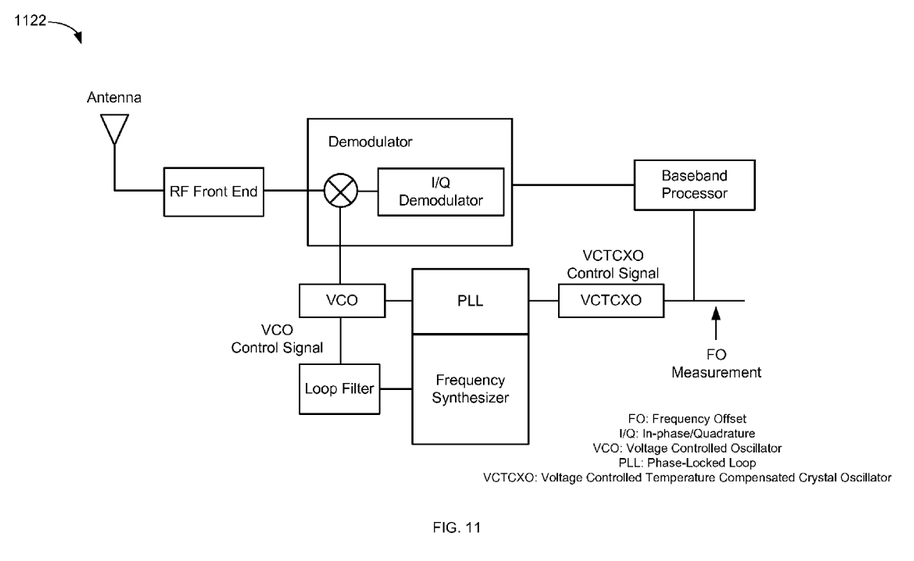
FIG. 11 shows an exemplary implementation of Automatic Frequency Control for measurement of frequency offset, in accordance with embodiments of the methods and mobile device of the disclosure.

In embodiments, the FO measurement module is integrated as part of an Automatic Frequency Control (AFC) system, which is configured to compensate for Doppler effects that could cause a loss of synchronization between the mobile device and the network. An exemplary AFC control system 1112 is shown in FIG. 11, the operation of which would be readily understood by a worker skilled in the art.

A worker skilled in the art will readily understand the various techniques and hardware modules that may be used within a RSSI measurement module for measuring RSSI.

A worker skilled in the art would readily appreciate that the mobile device may be configured to measure RSSI and FO for reasons other than detecting a mobility of the mobile device. For example, RSSI measurements may be utilized for enhancing the efficiency of a wireless cellular network during handoffs, while FO measurements may be utilized for maintaining clock synchronization between the mobile device and the wireless network.

A worker skilled in the art will readily appreciate that methods of the disclosure may not require any changes to the wireless communication network. In embodiments, minimal changes to the hardware architecture of the mobile device are required.

Typical wireless systems such as the GSM/EDGE, WCDMA, CDMA-EVDO or TD-SCDMA require that mobile devices monitor a paging channel at regular intervals ('paging interval') preset by the wireless network. The measurements of both the RSSI and the Frequency Offset may therefore be obtained at successive time intervals that depend on the paging interval of the mobile device. For GSM-based cellular networks, the paging interval is typically 500 milliseconds.

Referring to FIG. 7, the mobile device 780 is linked to a cellular network 790 through a base-station 792, and thereby to one or more servers 794, 794*a* (exemplarily of a service and application provider or a data and content provider). Additional mobile devices 780*a* may be linked to the cellular network 790 using the same base station 792 or a separate base station 792*a*. The cellular network 790 thus allows data communication between peer mobile devices 780, 780*a*.

The mobile device 780 sends and receives wireless communication signals via a RF transceiver 784. When communicating wirelessly with a base station 792 of a wireless network 790, the device 780 may communicate in accordance with one or more appropriate technologies such as: Global Systems for Mobile communications (GSM), General Packet Radio Service (GPRS), Code Division Multiple Access (CDMA), Wideband CDMA (WCDMA), whether 2G, 3G, High speed packet access (HSPA), Universal Mobile Telecommunication System (UMTS) based technologies, Enhanced Data rates for Global Evolution (EDGE), Long Term Evolution (LTE) technologies, Orthogonal Frequency Division Multiplexing (OFDM) technologies, Ultra-Wideband (UWB) technologies, WiFi™, BlueTooth™ or WiMAX™ technologies, or other communication technologies and protocols as would readily be understood by a worker skilled in the art. In some embodiments, the wireless device 780 may be capable of operation using multiple protocols. The base stations 792, 792*a* may be part of a wireless network, such as a cellular network, local-area network, wide-area network, wireless hotspot network, or the like. The wireless device, base station, network components, and the like, may be configured for data communication, voice communication, or a combination thereof, possibly using additional components, configurations and procedures where appropriate, such as SIM cards, authorization and authentication procedures, handoff procedures, and the like, as would be readily understood by a worker skilled in the art.

Appropriate communication protocols and network architectures that support various types of communication would be readily known to a worker skilled in the art. Exemplarily, audio signals may be transferred either in circuit-switched or packet-switched fashion through the communication. The communication signals may be broadcast or multicast.

The processing required for obtaining the mobility parameter may also be optionally performed by a server communicatively linked to the mobile device, either alone or in combination with the processing module of the mobile device. The distribution of the processing burden may be based on the amount of data available for processing and the available communication bandwidth for data transfer between the various processing entities and the battery level of the mobile device. The server may be managed exemplarily by a service and application provider.

This new technology has been described in terms of specific implementations and configurations (and variants thereof) which are intended to be exemplary only. The scope of the exclusive right sought by the applicant is therefore intended to be limited solely by the appended claims.

The invention claimed is:

1. A method of detecting a speed of mobility of a mobile device, said method comprising:
 obtaining plural measurements of Relative Signal Strength Indications (RSSI);
 obtaining plural measurements of Frequency Offset (FO);
 monitoring a paging channel at a paging interval; and
 obtaining a mobility parameter indicative of the speed of mobility of said mobile device, the mobility parameter based at least partly on said measurements of RSSI and FO;
 wherein successive measurements of RSSI and successive measurements of FO are separated by a time interval, wherein the time interval is based at least in part on the paging interval.

2. The method of claim 1, wherein said obtaining of the mobility parameter utilizes a plurality of parameters indicative of statistical distributions of said measurements of RSSI and FO.

3. The method of claim 1 further comprising:
 utilizing said mobility parameter to allow a reconfiguration of the mobile device from a first operating state to a second operating state.

4. The method of claim 1, wherein said mobility parameter is an estimated speed of mobility of the mobile device or a digital parameter obtained by processing said estimated speed of mobility of the mobile device.

5. The method of claim 4 wherein said processing comprises comparing said estimated speed of mobility of the mobile device to one or more threshold speeds.

6. The method of claim 1, wherein said mobility parameter is user perceptible using one or more numerical or graphical mobility indicators (998*a*, 998*b*).

7. The method of claim 3, wherein the first operating state and the second operating state differ in at least one of the following: one or more device parameter values and enablement settings of one or more device features, defining each of said operating states.

8. The method of claim 7, wherein a device feature is enabled in the first operating state and disabled in the second operating state.

9. The method of claim 3, wherein said reconfiguration from the first operating state to the second operating state occurs automatically if said mobility parameter is outside of a mobility criterion range.

10. The method of claim 3, wherein said mobile device remains configured in said first operating state if said mobility parameter is outside of a mobility criterion range and if a user override input is received.

11. The method of claim 3, wherein said reconfiguration is performed based on a user input.

12. The method of claim 9, wherein said mobility criterion range is user-selectable or is pre-determined.

13. The method of claim 1, further comprising sending data to or receiving data from one or more peer mobile devices or servers, communicatively linked with said mobile device.

14. The method of claim 13, wherein said data is indicative of said mobility parameter.

15. A computer program product configured for detecting a speed of mobility of a mobile device, the computer program product comprising code which, when loaded into a memory and executed on an associated processor, is adapted to perform:
obtaining plural measurements of Relative Signal Strength Indications (RSSI);
obtaining plural measurements of Frequency Offset (FO);
monitoring a paging channel at a paging interval; and
obtaining a mobility parameter indicative of the speed of mobility of said mobile device, the mobility parameter based at least partly on said measurements of RSSI and FO;
wherein successive measurements of RSSI and successive measurements of FO are separated by a time interval, wherein the time interval is based at least in part on the paging interval.

16. The computer program product of claim 15 further adapted to perform:
utilizing said mobility parameter to allow a reconfiguration of the mobile device from a first operating state to a second operating state.

17. A mobile device configured to detect its speed of mobility, said mobile device configured to monitor a paging channel at a paging interval, said mobile device comprising:
a Relative Signal Strength Indications (RSSI) measurement module configured to obtain plural measurements of RSSI;
a Frequency Offset (FO) measurement module configured to obtain plural measurements of FO; and
a processing module operatively associated with the RSSI measurement module and the FO measurement module to receive said measurements of RSSI and FO therefrom, and configured to obtain a mobility parameter indicative of the speed of mobility of said mobile device, the mobility parameter based at least partly on said measurements of RSSI and FO, wherein successive measurements of RSSI and successive measurements of FO are separated by a time interval, wherein the time interval is based at least in part on the paging interval.

18. The mobile device of claim 17, wherein said processing module is further configured to determine an operating state of the mobile device.

19. The mobile device of claim 17, further comprising a user interface configured for user perceptibility of at least part of said mobility parameter.

20. The mobile device of claim 19, wherein said user interface is further configured to receive a user input relating to the reconfiguration of the operating state of the mobile device.

21. The mobile device of claim 17, further comprising a user interface configured to signal for user perceptibility if said mobility parameter is at least partially outside a mobility criterion range.

22. The method of claim 1 wherein obtaining the mobility parameter comprises processing performed by said mobile device or processing performed by a communicatively linked server or processing performed by a combination of the mobile device and a communicatively linked server.

23. The method of claim 1 further comprising monitoring a battery power level of the mobile device and varying the time interval for measurements of RSSI and FO based at least in part on the battery power level.

24. The method of claim 1, wherein successive measurements of RSSI and successive measurements of FO are separated by a first time interval when the mobile device is in an idle mode and wherein successive measurements of RSSI and successive measurements of FO are separated by a second time interval when the mobile device is in an active mode, wherein the first time interval and the second time interval are based at least in part on the paging interval, and wherein the first time interval is longer relative to the paging interval than the second time interval.

* * * * *